United States Patent [19]
Coureau

[11] 3,950,959
[45] Apr. 20, 1976

[54] DEVICE FOR TRANSFERRING LIQUIFIED GAS

[76] Inventor: Jean-Claude Coureau, 18 Le Clos Perrault, 91200 Athis Mons, France

[22] Filed: Feb. 22, 1973

[21] Appl. No.: 334,610

[30] Foreign Application Priority Data
Feb. 22, 1972 France .............................. 72.05841

[52] U.S. Cl. .................................. 62/55; 137/468; 236/99 R; 251/95; 251/111
[51] Int. Cl.² ........................................ F17C 17/02
[58] Field of Search ............... 62/45, 48, 55, 225; 236/93, 99 R; 137/468; 251/11, 89, 95, 111

[56] References Cited
UNITED STATES PATENTS

| | | | |
|---|---|---|---|
| 2,971,741 | 2/1961 | Eppler et al. .......................... | 251/89 |
| 3,054,273 | 9/1962 | McGrath ............................ | 62/225 X |
| 3,091,394 | 5/1963 | Sparrow ............................. | 251/11 X |
| 3,239,189 | 3/1966 | Ray ...................................... | 251/11 |
| 3,362,177 | 1/1968 | Case ..................................... | 62/55 |
| 3,366,139 | 1/1968 | Shaw .................................. | 62/55 X |
| 3,386,065 | 5/1968 | Algino .............................. | 251/11 X |
| 3,401,605 | 9/1968 | Born .......................... | 62/DIG. 5 X |

Primary Examiner—William F. O'Dea
Assistant Examiner—Ronald C. Capossela
Attorney, Agent, or Firm—Robert E. Burns; Emmanuel J. Lobato; Bruce L. Adams

[57] ABSTRACT

A device for controlling the transfer of liquefied gas from a storage tank to a consumer apparatus or circuit, comprises a closing valve placed in the transfer circuit linking the storage tank and the consumer apparatus. A device locks the valve in the operative or inoperative state, to maintain a valve in the open or closed position. Control means normally attract the valve in the direction of opening when the valve is closed and conversely in the direction of closure when the valve is opened. A working device controlled from outside acts on the locking device to move it from the operative to the inoperative state.

11 Claims, 5 Drawing Figures

DEVICE FOR TRANSFERRING LIQUIFIED GAS

BACKGROUND OF THE INVENTION

The invention relates to the transfer of a fluid, in particular a liquefied gas.

All the solutions proposed so far to solve the problem of the transfer of liquefied gas from a storage container to a consumer apparatus are rather awkward since the pressurisation calls for a large number of organs: compressed gas source, pressure relief valve set, reversing cock, control gate and numerous control elements.

The known solutions present a number of disadvantages, in particular that they are awkward due to the multitude of organs necessary and also they are technically delicate since the working of a mechanical dividing organ is rendered difficult by the low temperatures of the fluid carried.

SUMMARY OF THE INVENTION

The aim of the present invention is to lessen the above disadvantages by proposing a particularly simple solution to the problem of transferring fluid, for instance liquefied gas.

Another essential aim of the present invention is thus to be able to realise this transfer without using outside energy (electricity and compressed gas).

In accordance with the invention, the valve opening and closing control is effected by the variation of the pressure of one or several fluids. Such a variation in pressure is the result either of an action by the consumer or a modification of external physical conditions.

The means used to obtain the pressure variation considered are very numerous and the present invention preferably uses three particularly advantageous ones. In a first variation an adsorbent body is used (alumina, coconut, . . . ) placed in a casing. The pressure of the gas contained in this casing depends on the volume of the gas adsorbed by the adsorbent body, this quantity itself being a function of the temperature of the body.

In a second variation a source of pressurised gas is used, the pressure being varied directly or indirectly as a function of the requirements.

In a third variation, this pressure variation is the result of the passage of a fluid from the dry vapour state to the saturated vapour state and vice versa.

In all these cases, a pressure variation of a fluid is sought, this variation serving to control the dividing valve of the transfer.

The invention also relates to various types of controls for the transfer apparatus or device. These controls are operated mechanically, electrically, pneumatically, hydraulically or by other means by the variation of a pilot physical parameter such as temperature or the pressure of a gas. As previously this pressure variation can be achieved appropriately either with the aid of an adsorbent body or by the passage of a fluid from the dry vapour state to the saturated vapour state.

It is understood that the variations described in this text are not only applicable to the special case considered but also for all other applications relating to the transfer of fluids.

To this end the device for the transfer of liquefied gas from a storage tank to a consumer apparatus or circuit is characterised by the fact that it comprises a closing valve placed on the transfer circuit joining the storage tank and the consumer apparatus, a device locking the valve in the operative or inoperative state, maintaining this valve in the open or closed position, control measures normally attracting the valve in the directon of opening when the valve is closed and conversely in the direction of closing when it is open, and an operating device, controlled externally, acting on the locking device to change it from the operative to the inoperative state.

BRIEF DESCRIPTION OF THE DRAWINGS

The invention will be better understood with the aid of the following description and several non-limitative practical embodiments referred to in the attached drawing.

DESCRIPTION OF THE PREFERRED EMBODIMENT

Figure 1:
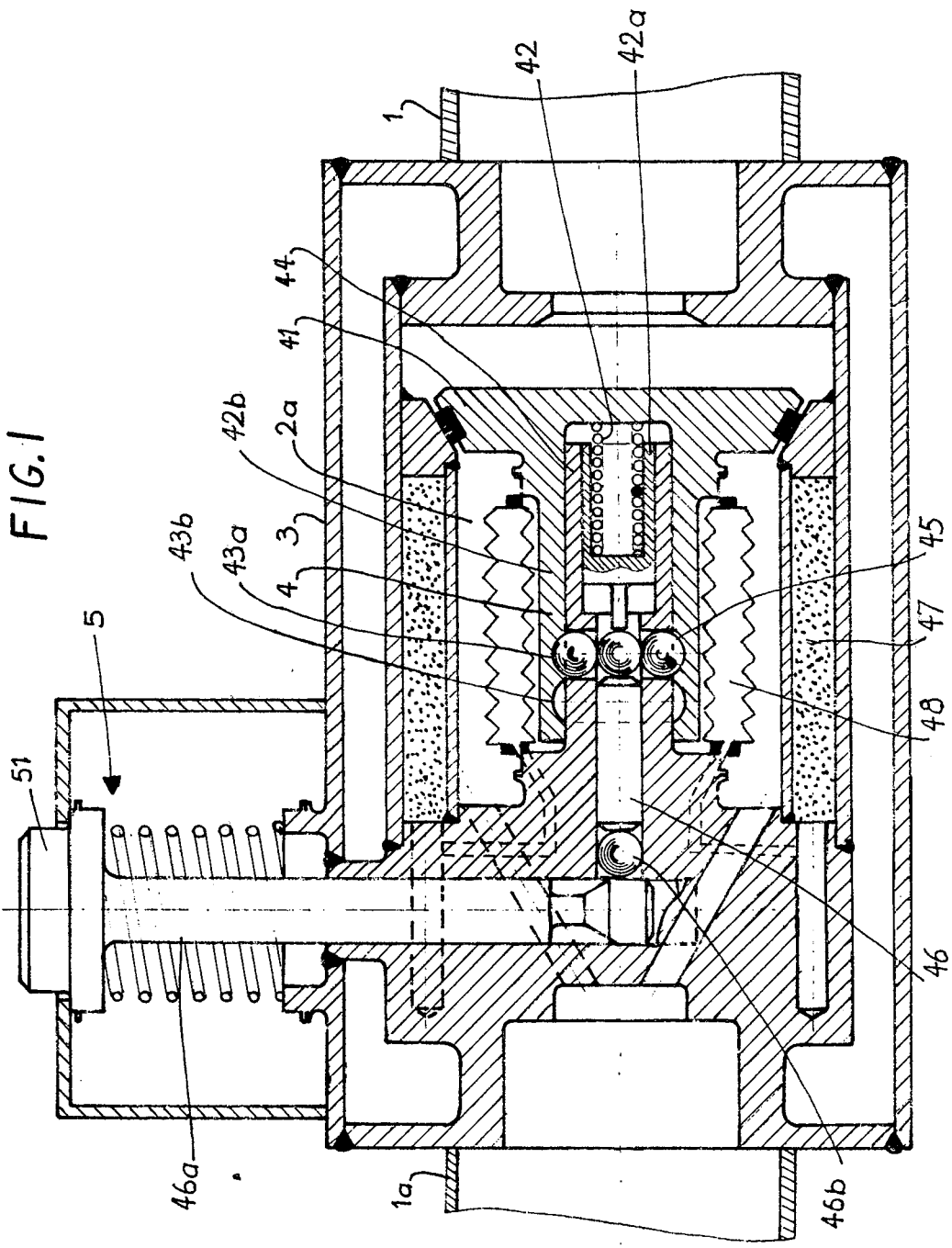
FIG. 1 shows a schematic sectional view of a control device for the transfer of a liquefied gas.

FIG. 1 shows a device for controlling the transfer of a liquefied gas contained in a fragmentarily shown tank 1 to a consumer apparatus 1a which is also shown schematically and in part. The device assumes the form of an apparatus comprising a body 3 inside which is provided a transfer circuit 2a connected upstream with the tank 1 and downstream with the consumer apparatus 1a.

The body 3 encloses a first set of organs for controlling the opening or closing of the valve and a second set of organs for operating this opening or closing.

The second set of organs 4 is intended to operate the movement of a mobile valve 41 which can stop the transfer circuit 2a and comprises: a balancing spring 42 balancing a part of the gas pressure contained in the tank 1, resting on the downstream face of the valve 41 and on a part forming a dish 42a mounted such that it slides axially in a fixed guide part 44 forming a sleeve, one or several locking balls 45 which can slide in the radial apertures of the guide part 44 and which are attracted by the dish 42a to come to rest in one or the other of the two sets of housings 43a, 43b, in dish form provided on the internal face of the rod of valve 42b in contact with the external face of the guide part 44 to lock this rod 42b in one or the other of two positions along the general axis of displacement, the valve either opened or closed, an axial working rod 46 permitting the balls 45 to be acted upon to retract them from the said housing, an auxiliary working rod 46a acting on the axial rod 46 through the intermediary of a junction ball 46b to permit the axial displacement of the axial working rod taking into consideration a pulse given by a control organ constituting the first set of organs considered, the set being marked with the reference 5 and to which we shall come back later.

In accordance with the invention a control capacity 48 which is a bellows can be formed elastically rests on the one hand on the guide part 44 and on the other on the rod of valve 42b. This capacity is filled with a working gas of variable pressure such that this capacity 48 attracts valve 41 in the direction of opening or closure according to whether valve 41 is closed or open.

In a preferred but non-limitative embodiment, a first working tank or space 47 located close to the transfer circuit 2a downstream of valve 41 is filled with an adsorbent body and is connected with the control capacity 48.

The first set of organs . . can be operated mechanically, electrically, pneumatically, etc. . . . . In its most simple form it is constituted for instance by a pushbutton 51 permitting the axial displacement of the axial working rod 46 by a simple external impulse.

The invention will be better understood with the aid of the description of the functioning of the device: at the moment of starting conditions are as follows: the valve being closed, the pressure of the working gas contained in the working tank 47 and the control capacity 48 is relatively high since the temperature of the adsorbent body is high. Consequently the elastic control capacity tends to act on valve 41 in the direction of opening.

By a simple pulse on the control organ 5 given by the consumer or by any other means, the valve is unlocked by the balls 45 leaving housings 43a. Under the influence of the elastic control capacity 48, the valve 41 is moved in the direction of opening. Once the housings 43b are opposite the balls 45, the latter penetrate into these housings so as to lock the valve 41 in the open position.

Once the transfer has commenced, the temperature of the adsorbent body is reduced by the transfer such that the working gas pressure drops and valve 41 is attracted in the direction of closing.

By a simple impulse given to the control organ 5 the balls 45 are retracted from housings 43a and valve 41 is unlocked and comes to rest on its seat. The transfer ceases and balls 45 penetrate into housings 43b, locking the valve in the closed position.

Naturally as has already been indicated the pressure variation controlling the valve in the direction of opening or closing is not necessarily due to the presence of an adsorbent body but may, for instance, be the result of the passage of a fluid from the dry vapour state to the saturated vapour state. More generally the elastic control capacity 48 may be connected with a variable pressure gas source varying in the same way as indicated above.

Figure 2:
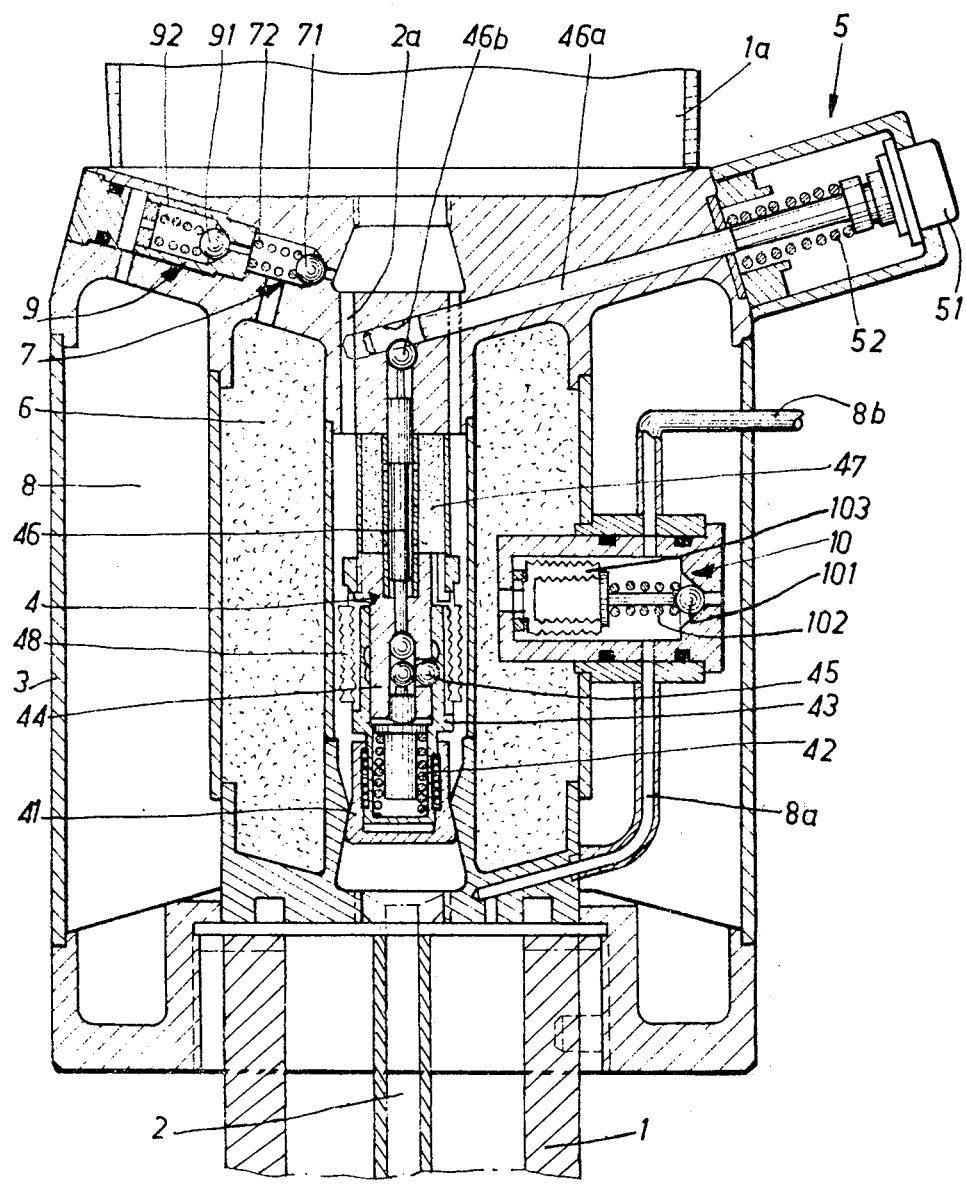
FIG. 2 is a schematic sectional view of a transfer device for liquefied gas in accordance with the invention.

FIG. 2 shows a device for the transfer of a liquefied gas contained in a tank 1 shown in part, provided with a drawing-off rod 2 to a consumer apparatus 1a also shown schematically and in part.

This transfer device comprises elements equivalent to those described above represented on FIG. 2 by the same reference numbers. These are a body 3, a second set of organs 4 considered in the case using an adsorbent body and a first set of organs 5.

The second set of organs 4 constitutes a variation in part. The spring 42 rests on valve 41 and on a sliding part 43 forming a sleeve and on which is mounted the valve 41 sliding axially; the sliding part 43 carrying housings 43a and 43b is mounted such that it can slide on the fixed guide parts 44.

In addition this transfer device comprises a third set of organs associated with the first two sets described to permit the transfer and comprising:

a second tank 6 also close to the transfer circuit 2a, and overall downstream of valve 41, provided with an adsorbent body, connected on the one hand with transfer circuit 2a via a first adsorption valve 7, closed when the pressure of the pressurisation gas in the tank 6 is greater than the pressure of the gas to be transferred in circuit 2a and, on the other hand, with a temporary storage enclose 8 of the pressurisation gas via a second desorption valve 9, closed when the pressure of the pressurisation gas in the second tank 6 is lower than the pressure of the gas contained in the temporary storage enclosure 8, the pressurisation gas being of the same nature as the gas to be transferred to avoid any confusion and coming from a preceding transfer sequence as will be explained below.

The temporary storage enclosure 8 is connected with two conduits, a transfer conduit 8a and an escape conduit 8b, via a third transfer valve 10. The transfer conduit 8a is directly connected with tank 1, the escape conduit 8b being connected with a safety organ such as a safety valve not shown in the figure.

The transfer valve 10 is open and the temporary storage enclosure 8 is connected with the transfer and escape conduit 8a and 8b when the pressure of the gas in the second tank 6 drops below a certain threshhold. To this end the transfer valve 10 is constituted for instance by a ball 101 held on its seat by a spring 102 and by a small elastic capacity 103 permanently connected with the second tank 6, comprising the spring 102 so as to hold ball 101 on its seat and thus close the transfer valve 10 when the pressure of the gas contained in the tank 6 is highest and, conversely, releasing the ball 101 from its seat to open the transfer valve 10 when the pressure of the gas contained in this second tank 6 is reduced. The known threshhold beneath which the opening of the transfer valve 10 is effective corresponds to a certain degree of adsorption of the adsorbent body contained in the second tank 6.

The other adsorption and desorption valves 7 and 9 are constituted, for instance, respectively by a ball 71, 91 held on its seat by a spring 72, 92.

The device functions as follows: at the moment of starting the conditions are: the pressure of the pressurisation gas contained in the second tank 6 is equal to the pressure of that contained in the temporary storage enclosure 8 and greater than the pressure of the gas in the storage tank 1. The adsorption valves 7, desorption valves 9 and transfer valves 10 are in the closed position. As seen above, a brief impulse on the control organ 5 causes valve 41 to open and the liquefied gas to be transferred from the tank 1 to the consumer apparatus 1a via the transfer circuit 2a.

The passage of the transferred gas causes a drop in the temperature of the adsorbent body contained in the second tank 6 and the adsorption of the residual gas located in the second tank. This pressure drops until the adsorption valves 7 and transfer valves 10 open, which is effected after a certain degree of adsorption. The opening of adsorption valve 7 permits the evaporations of the transferred gas to be adsorbed by th adsorbent body of the second tank 6 as the transfer proceeds. The opening of the transfer valve 10 connects the temporary storage enclosure 8 and tank 1 and, since the pressure of the pressurisation gas contained in this enclosure 8 is higher than the pressure of the gas in tank 1, the pressurisation gas is transferred from this enclosure 8 to the tank 1 and compensates the drop in pressure of the gas in this tank 1. When desired by the consumer or as a function of an outside order, the second set constituted by the control organ is operated to cause valve 41 to close as has been explained above, thus stopping the transfer. The adsorbent body of the second tank 6 sees its temperature rising progressively and the gas adsorbed during the preceding transfer is thus desorbed. There results an increase in the pressure of the gas in the second tank 6 which has the effect of closing the adsorption valves 7 and transfer valves 10 and opening the desorption valve 9 so as to transfer the desorbed gas from the second tank 6 to the temporary storage enclosure 8 where this gas serving for pressurisation will later be used for the next transfer.

Naturally the device which has just been described has been described purely indicatively and may form the object of a large number of variations remaining within the spirit of the invention. The first and second sets of organs described can be improved in the same way as the previous ones, the device described being original in that it combines these two sets with a temporary gas storage enclosure for pressurisation, drainage and filling operated automatically and bringing into play the phenomenon of adsorption.

Figure 3:
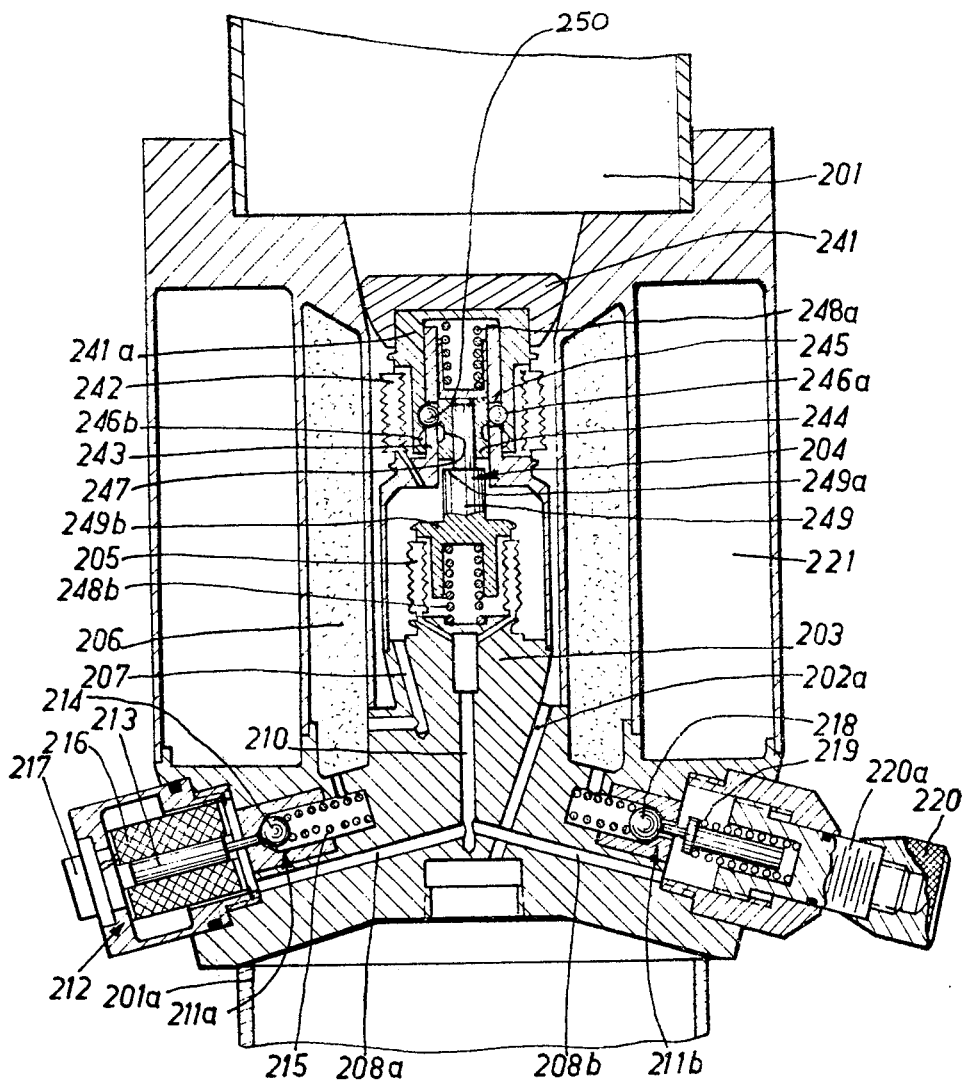
FIGS. 3, 4 and 5 are sectional views of three variations of the control form represented more particularly in the case of application on a transfer gate but which can also be used for a transfer device as shown on FIG. 2.
Figure 4:
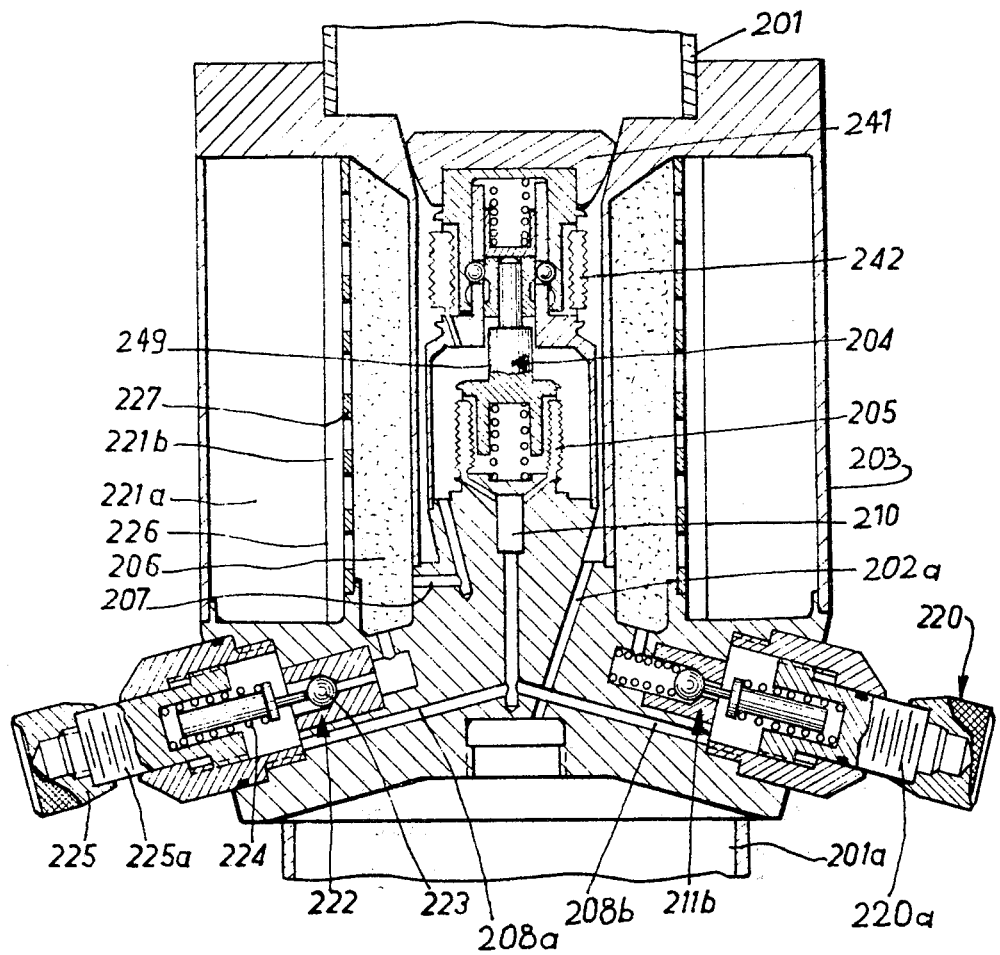
Figure 5:
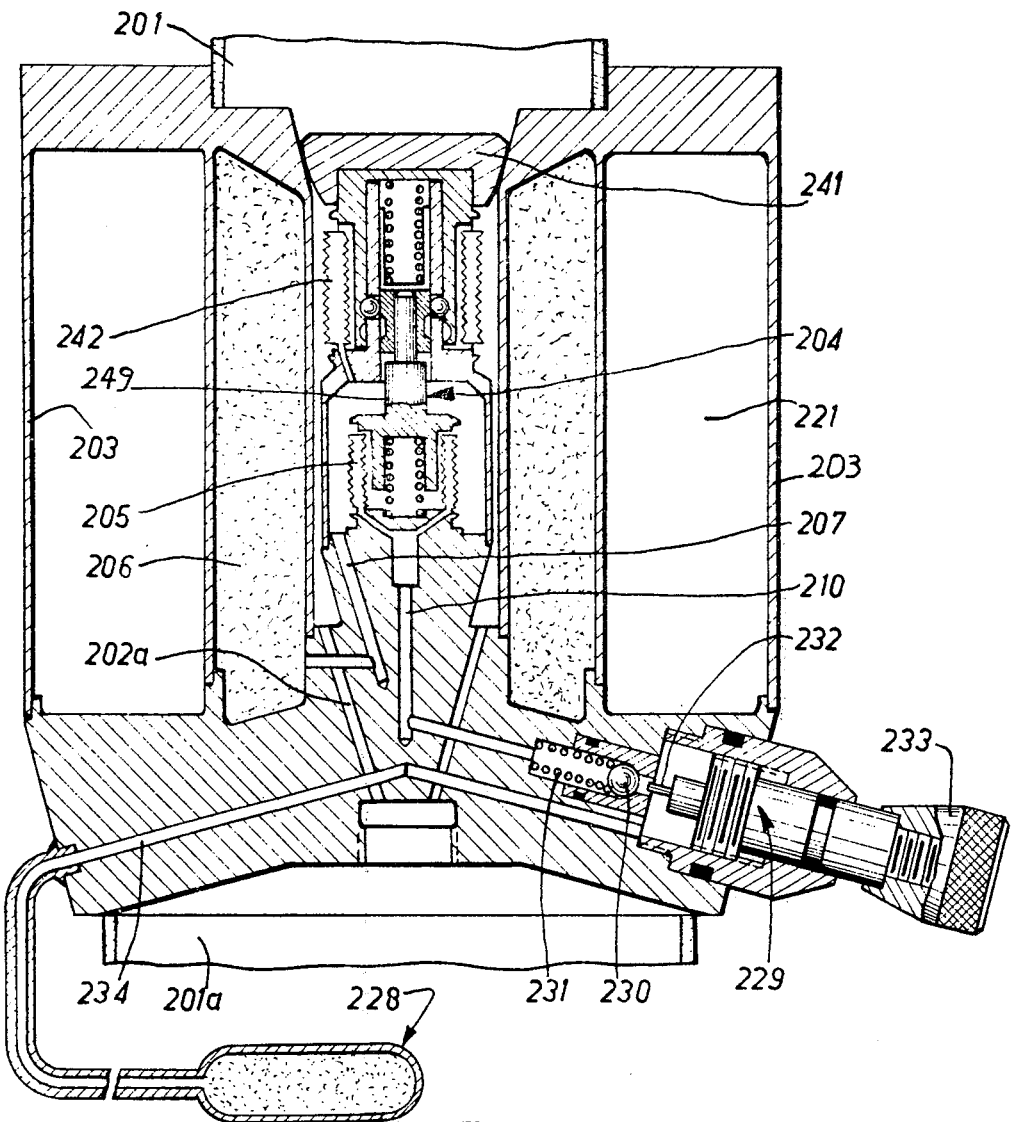

FIGS. 3, 4 and 5 show three variations illustrating different possible controls. So as to simplify the explanation, these different types of controls are shown and described in the case of application on a transfer gate. However it is understood that these controls can be used for a liquefied gas transfer device being then associated with a temporary storage enclosure such as described above. The three control variations considered operate respectively by electric impulse and mechanical timing, by mechanical timing and by detection of the value of a pilot physical parameter outside the control apparatus. A certain number of identical organs will be found in these variations which are described once only and marked with the same reference numbers on the figures.

FIG. 3 shows an all-or-nothing control, which may be opened e.g. by electrical impulse and closed automatically.

The apparatus comprises a body 203 branched between a tank 201 of liquefied gas to be transformed and the consumer apparatus 201a shown in part. The tank 201 and consumer apparatus 201a are connected by a transfer circuit 202a in the body 203 which can be stopped by a mobile valve 241 belonging to a working mechanism, the whole of which is marked 204. This working mechanism 204 constitutes a partial variation from the mechanisms described previously. It is located entirely downstream of valve 241 and comprises an elastic control capacity 242 (which may for instance be a flexible tank which can be deformed such as a pair of bellows), controlling the valve 241 in its direction of opening or closing, the valve 241 being supported by a rod of valve 241a forming a sleeve sliding axially on a fixed part 243 which is integral with body 203 and also forms a sleeve inside which a sliding moving part 244 slides axially. A set of cylindrical holes 245 with radial and coplanar axes crosses the fixed guide part 243. The internal surface of the rod of valve 241a in contact with the fixed part 243 is hollowed out by two sets of dish-shaped housings 246a, 246b which may be located respectively opposite holes 245 when the valve 241 is open or closed respectively. The outside surface of the mobile part 244 is hollowed out by a set of dish-shaped housings 247 which may be located opposite holes 245 (and possibly housings 246a or 246b), when valves 241 is unlocked, and, next to these latter when the valve is locked. Locking balls 250 can slide into holes 245 and be partially housed in these holes and partially either in housings 246a or in housings 246b or housings 247. A control spring 248a resting on sliding parts 244 and on the rod of valve 241a attracts valve 241 in the direction of opening. A push rod 249 partially guided by the fixed guide part 243 and sliding in the mobile sliding parts 244 carries a first shoulder 249a which can drive the mobile sliding parts 244 in the direction of valve 241 and a second shoulder 249b on which an elastic working capacity 205 rests, also resting on body 203. A working spring 248b rests on body 203 on the one hand and on the push rod 249 on the other to attract the latter in the direction of valve 241.

When they are filled with pressurised gas, the elastic control capacity 242 and working capacity 205 attract the valve 241 in the direction of opening.

Immediately adjacent to the transfer circuit 202a a casing 206 is located containing an adsorbent body permanently connected with the control capacity 242 through the intermediary of conduits 207. The casing 206 is also connected with the working capacity 205 by two series of conduits, i.e. desorption conduits 208a and adsorption conduits 208b which connect with a single conduit 210 opening in the working capacity 205. A desorption valve 211a and an adsorption valve 211b are respectively interposed on desorption conduit 208a and adsorption conduit 208b.

The desorption valve 211a is opened by the influence of an external impulse given, for instance, by the consumer. For example valve 211a assumes the form of an electric control organ 212 comprising a rod forming a stem 213 which can act on a locking ball 214 normally attracted on its seat by a spring 215. A spool 216 excited either by the consumer on a pushbutton 217 or by any other way pushes back rod 213 to move it against spring 215 and open valve 211a.

The adsorption valve 211b opens when the pressure of the gas contained in casing 206 drops below a certain threshhold adjustable as a function of the greater or lesser force exercised by a calibration spring 219 acting on a ball 218, this spring being adjusted at the required threshhold by action on a closing nut which is moved in front of a graduated scale 220a.

At the periphery of the casing 206 a closed and empty cavity 221 is arranged playing the role of a thermal insulation.

On starting, the working gas under pressure contained in the elastic control capacity 242 tends to open valve 241. Due to the difference in pressure between the outside and inside, the elastic working capacity 205 is compressed. The mobile sliding part 244 holds balls 250 outside housings 247 and in housings 246a so that valve 241 is kept closed. The working gas under pressure in casing 206 tends to close the desorption and absorption valves 211a and 211b.

By a simple impulse from the outside the desorption valve 211a is opened. For instance the consumer may operate the control button 217 exciting spool 215 which acts on the rod forming the stem 213 to move the ball 214 from its seat. The working gas under pressure contained in the casing 206 penetrates in the working capacity 205 via the desorption valve 211a, the desorption conduit 208a and the single conduit 210. The spread of the elastic working capacity 205 causes the axial displacement of the push rod 249 in the direction of opening of valve 241. The moving sliding part 244 is moved in the direction of valve 241 and the control spring 248a is compressed until the locking balls 250 are opposite housings 247. Balls 250 leave housings 246a and penetrate in housings 247, the control spring 248a tending to spread in the same way as the elastic control capacity 242 jointly causes the opening of valve 241, subsequently locked in the open position when balls 250 penetrate housings 246b, leaving housings 247. The transferred gas then circulates from tank 201 to the apparatus 201a.

The pressure of the working gas in the elastic control capacity 242 drops due to the adsorption of this gas such that valve 241 is attracted towards its closed position. By manual regulation of the nut 220, the pressure exercised by the calibration spring 219 on ball 218 is adapted. The pressure of the working gas in casing 206 drops to a certain value as a function of the previous adjustment, at which ball 218 leaves its seat so that the adsorption valve 211b is opened. The working gas pressure in the elastic working capacity 205 drops in such a way that the push rod 249 is moved in the opposite direction to that of valve 241. The mobile sliding part 244 is moved in the opposite direction to valve 241 until the balls 250 leave housings 246b when these are opposite housings 247. Under the effect of the differences in pressure, valve 241 returns to its seat and balls 250 occupy their original position in housings 246a keeping the valve locked and closed.

The first preceding variation has been described in the case of use on a transfer gate but it should be understood that this can also be used on a transfer device as described previously and comprising in particular a temporary storage enclosure for the transferred gas. In this latter case the cavity 221 may constitute this temporary storage enclosure.

FIG. 4 shows a variation in which the closing of the valve is automatic and of the all-or-nothing type. A body 203, a transfer circuit 202a, a valve 241, a working mechanism set 204, a casing 206 provided with an adsorbent body, conduits 207, other desorption and adsorption conduits 208a and 208b, an adsorption valve 211b, its spring 219, its nut 220 and locking ball 218 are to be found.

Instead of the electric control organ 212 and desorption valve 211a, we have here an automatic opening valve 222 constituted by a ball 223 attracted in the direction of its seat by a spring 224 of which the force is adjustable and can be varied by simply moving an opening nut 225 opposite a graduated scale 225a. The automatic opening valve is interposed on the desorption conduits 208a connecting casing 206 and the working capacity 205 through the intermediary of conduit 210. In this variation the cavity 221 is divided in two sub-cavities, an external sub-cavity 221a and an internal sub-cavity 221b separated by a continuous wall 226. A discontinuous wall 227 limits the volume of casing 206 containing the adsorbent body. The working gs desorbed by the adsorbent body can occupy the volume of the internal sub-cavity 221b connecting with casing 206 while conversely, when thermal insulation is necessary, i.e. when the temperature of the adsorbent is reduced or when the liquefied gas is transferred, the adsorption of the working gas produces a partial vacuum in the internal sub-cavity 221b which contributes to the thermal insulation.

Naturally this variation has only been described in this particular case for greater simplicity but it is understood that it is applicable to all other variations without exception.

The initial conditions of operation are perceptibly identical with those defined in the preceding case. The automatic opening valve 222 is closed by a certain pressure exercised on ball 223 by spring 224 holding this ball on its seat.

By the consumers action on nut 225, the pressure exercised by spring 224 on ball 223 is reduced. For a position of the opening nut 225 as a function of the pressure of the working gas in casing 206, ball 223 moves from its seat and the automatic opening valve 222 is opened. In accordance with the process described above, there results an increase in the pressure of the working gas in the elastic working capacity 205 which has the ultimate effect of causing valve 241 to open.

The subsequent functioning of the apparatus is then the same as previously such that overall the functioning is cyclical with phases of operation (opening of valve 222) and stoppage (opening of adsorption valve 211b), the duration of the cycle being regulated by the action of the automatic opening nuts and adsorption nuts 225 and 220.

FIG. 5 shows a transfer device of the all-or-nothing type in which the opening and closing depend on the value of a pilot temperature such as that of the consumer apparatus for instance. The bringing into operation of the apparatus is effected by the action of a mechanical manual control (case shown in the figure) or electric control.

As above, we have a body 203, a transfer circuit 202a, a valve 241, the working mechanism set 204, a casing 206 provided with an adsorbent body and conduits 207.

In this latter variation, the elastic working capacity 205 is not connected with casing 206 but with a temperature detector 228 via operating valve 229. Preferably this temperature detector 228 is constituted by a flask filled with an adsorbent body placed in the zone of which the temperature serves as pilot to the transfer gate or transfer device. The temperature of the consumer apparatus can, for instance, serve as a pilot temperature. When the temperature of the gas in the consumer apparatus rises beyond a given threshhold, there is a deficit in the apparatus of liquefied gas and it then becomes necessary to transfer while conversely the transfer can be stopped when the temperature in the apparatus drops below another given threshhold.

More generally the temperature detector 228 is such that all sufficiently high temperature variations cause a variation in pressure of an auxiliary working gas filling the working capacity 205. The operating valve 229 comprises a ball 230, normally held on its seat under the influence of a spring 231 but which can be removed from this by moving a rod 232 actuated by an operating button 233.

Initially there are the same conditions as those described previously. In addition the operating valve 229 is closed and the auxiliary working gas contained in the temperature detector 228 is under pressure which indicates the necessity of transfer.

By actuating the button 233 valve 229 is opened, ball 230 being moved from its seat such that the auxiliary working gas under pressure contained in the temperature detector 228 penetrates directly into the elastic working capacity 205 via conduits 234 and 210. The expansion of the elastic working capacity 205 causes valve 241 to open and the transfer to start, the filling of the consumer apparatus with liquefied gas and hence the progressive cooling of the temperature detector 228. This cooling causes the adsorption of the auxiliary working gas by the adsorbent body contained in the temperature detector and consequently a decrease in the presence of this gas. The pressure of the auxiliary working gas in the working capacity 205 drops and its compression causes valve 241 to close as has already been explained. Due to the variations in temperatures in the consumer apparatus due to the transfer and stoppage of the transfer, successive cycles of operation and stoppage of the transfer gates are effected.

The apparatus is withdrawn from operation by actuating button 233 to bring ball 230 back to its seat and hence insulate the temperature detector 228 of the working capacity 205, rendering the pressure variations of the auxiliary working gas inoperative.

The various types of control, mechanical, electrical, by detection of the value of a pilot physical parameter, can naturally be applied regardless of whether we have a transfer device or a gate. However other types of control may be envisaged and remain within the spirit of the invention.

For example control by pulses can operate pneumatically or hydraulically or be due to a variation in pressure of a third fluid, this variation in pressure being the result of an action by the consumer or of a modification of external physical conditions on the transfer device or gate considered.

However in all the examples described so far the variation of the pressure of the gas serving to control the valve has been considered as being the result of adsorption and desorption phenomena. Naturally this is only a preferred embodiment but that is in no way limitative.

In a first possible variation, the adsorbent body is suppressed and the enclosure containing it is filled with a fluid in the dry vapor state or saturated vapour state as a function of temperature. The corresponding pressure is thus that of a dry vapour or of a saturated vapour at the temperature considered.

In another variation the adsorbent body is also suppressed and an outside source of gas is available of which the pressure variations are used to control the valve. This pressure variation is obtained by appropriate means, either indirectly or directly when it is due to a transfer.

Moreover it is clear that the thermal insulation cavity may always be sub-divided into two sub-cavities as was described in one of the examples. The working mechanism may form the subject of a number of improvements and has only been described in an illustrative manner. In all the variations described so far, the opening or closing of any valve only requires relatively slight absolute variations in pressure and to this end the springs used have been previously calibrated accordingly.

All the variations described so far for the transfer gate, transfer device, working mechanism, thermal insulation capacity, control organ and the means of effecting a pressure variation controlling the valve can be combined with one another and are thus the basis of a number of devices or appliances which can be used in particular for the transfer of liquefied gases and, more generally, in hydraulic cock and tap systems.

I claim:

1. A device for controlling the flow of a liquefied gas comprising:
   a. means defining a flowpath;
   b. a valve actuatable to an open condition and a closed condition for opening and closing said means defining a flowpath;
   c. means comprising a gas-filled closed circuit comprising an expandable and contractible hollow elastic member connected in said flow path directly to said valve and responsive to the temperature of said flow liquefied gas for biasing said valve to said open condition when said valve is closed and biasing said valve to said closed condition when said valve is open;
   d. means having a normally operative state and an inoperative state for locking said valve in said open condition and for locking said valve in said closed condition; and
   e. means controllable for rendering said means for locking said valve inoperative whereby said valve changes condition.

2. A device for controlling the flow of a liquefied gas according to claim 1, wherein said means for biasing said valve comprises means defining said closed circuit comprising a hollow elastic member filled with a gas comprises a bellows, means connecting said hollow elastic member between said valve and said means defining a flowpath, and means for increasing a pressure of said gas to bias said valve to open and for decreasing a pressure of said gas to bias said valve to close.

3. A device for controlling the flow of a liquefied gas comprising:
   means defining a flowpath;
   a valve actuatable to an open condition and a closed condition for opening and closing said means defining a flowpath;
   means comprising a gas-filled closed circuit comprising an expandable and contractible hollow elastic member connected in said flow path directly to said valve and responsive to the temperature of said flow liquefied gas for biasing said valve to said open condition when said valve is closed and biasing said valve to said closed condition when said valve is open;
   means having a normally operative state and an inoperative state for locking said valve in said open condition and for locking said valve in said closed condition;
   means controllable for rendering said means for locking said valve inoperative whereby said valve changes condition; and
   means for biasing said valve comprising means defining said closed circuit comprising a hollow elastic member filled with a gas comprises a bellows, means connecting said hollow elastic member between said valve and said means defining a flow path, and means for increasing a pressure of said gas to bias said valve to open and for decreasing a pressure of said gas to bias said valve to close, said means for increasing and for decreasing a pressure of said gas comprising means defining a gas chamber in communication with the interior of said hollow elastic member, a gas absorbing body in said means defining a gas chamber, and means defining a thermal flowpath between said means defining a gas chamber and a portion of said means defining said flowpath downstream of said valve whereby the gas contained in said means defining a gas chamber can exchange heat with a liquefied gas flowing through said means defining a flowpath.

4. A device for controlling the flow of a liquefied gas according to claim 3, wherein said means for increasing and for decreasing a pressure of said gas further comprises means defining a second gas chamber (6) disposed for exchanging heat with a portion of said means defining said flowpath downstream of said valve, a second gas adsorbing body disposed in said means defining a second gas chamber, means defining a gas temporary storage chamber (8), communication means defining flowpaths between said means defining said second gas chamber and said means defining said gas temporary storage chamber and said means defining said flowpath downstream of said valve, an absorption valve (7) disposed in said communication means for stopping communication of said means defining a second gas chamber and said means defining said gas temporary storage chamber with said means defining said flowpath when a gas pressure in said means defining a second gas chamber is greater than a gas pressure in said means defining a flowpath, a desorption valve (9) disposed in said communication means for stopping communication of said means defining a gas temporary storage chamber with said means defining a second gas chamber and with said means defining a flowpath when a gas pressure in said adsorption defining a gas temporary storage chamber is greater than a gas pressure in said means defining a second gas chamber, and means for charging said means defining a gas temporary storage chamber with a quantity of liquefied gas from said means defining a flowpath.

5. A device for controlling the flow of a liquefied gas comprising:
means defining a flowpath;
a valve actuatable to an open condition and a closed condition for opening and closing said means defining a flowpath;
means comprising a gas-filled closed circuit comprising an expandible and contractible hollow elastic member connected in said flowpath directly to said valve and responsive to the temperature of said flow liquefied gas for biasing said valve to said open condition when said valve is closed and biasing said valve to said closed condition when said valve is open;
means having a normally operative state and an inoperative state for locking said valve in said open condition and for locking said valve in said closed condition; and
means controllable for rendering said means for locking said valve inoperative whereby said valve changes condition, said means controllable for rendering said means for locking said valve inoperative comprising means controllable for rendering said means for locking said valve inoperative when said valve is in said closed condition whereby said valve opens, and means responsive to a temperature of said means defining a flowpath for automatically rendering said means for locking said valve inoperative when said valve is in said open condition after a predetermined quantity of liquefied gas flows through said means defining said flowpath whereby said valve closes.

6. A device for controlling the flow of a liquefied gas according to claim 5, wherein said means biasing said valve comprises means actuated by gas pressure and said means responsive to a temperature of said means defining a flowpath comprises means defining a gas chamber disposed for exchanging heat with a portion of said means defining a flowpath downstream from said valve, a gas adsorbing body disposed in said means defining a gas chamber, communication means defining a flowpath between said means defining a flowpath between said means defining a gas chamber and said means biasing said valve, and valve means disposed in said communication means for providing gas from said means defining a gas chamber to said means biasing said valve when said valve is closed whereby said valve is biased toward said open condition and for providing gas from said means biasing said valve to said means defining a gas chamber when said valve is open after liquefied gas has flowed through said means defining a flowpath whereby said valve is biased toward said closed condition.

7. A device for controlling the flow of a liquefied gas according to claim 5, wherein said valve means disposed in said communication means comprises a valve seat disposed in the flowpath defined by said communication means, a ball valve disposed between said valve seat and said means defining said gas chamber, first means biasing said ball valve to engage said valve seat, and second means biasing said ball valve to disengage said valve seat, said second means having adjusting means for adjusting a force with which said ball valve is biased to disengage said valve seat whereby said ball valve disengages from said valve seat to allow gas to flow from said means biasing said valve to said means defining a gas chamber to close said valve when a pressure of the gas actuating said means biasing said valve exceeds a predetermined value determined by the forces applied to said ball valve by said first and said second means.

8. A device controlling the flow of a liquefied gas comprising:
means defining a flowpath;
a valve actuatable to an open condition and a closed condition for opening and closing said means defining a flowpath;
means comprising a gas-filled closed circuit comprising an expandible and contractible hollow elastic member connected in said flowpath directly to said valve and responsive to the temperature of said flow liquefied gas for biasing said valve to said open condition when said valve is closed and biasing said valve to said closed condition when said valve is open;
means having a normally operative state and an inoperative state for locking said valve in said open condition and for locking said valve in said closed condition; and
means controllable for rendering said means for locking said valve inoperative whereby said valve changes condition, said means controllable for rendering said means for locking said valve inoperative comprising, means responsive to a temperature of said means defining said flowpath for automatically rendering said means for locking said valve inoperative when said valve is in said closed condition and a temperature of said means defining a flowpath exceeds a first predetermined temperature and for automatically rendering said means for locking said valve inoperative when said valve is in said open condition and the temperature of said means defining a flowpath is less than a second predetermined temperature, said second temperature being less than said first temperature, whereby said valve is automatically opened and closed to control the flow of a liquefied gas to maintain the temperature of said means defining a flowpath between approximately said first and said second temperatures.

9. A device for controlling the flow of a liquefied gas comprising:
   means defining a flowpath;
   a valve actuatable to an open condition and a closed condition for opening and closing said means defining a flowpath;
   means comprising a gas-filled closed circuit comprising an expandable and contractible hollow elastic member connected in said flowpath directly to said valve and responsive to the temperature of said flow liquefied gas for biasing said valve to said open condition when said valve is closed and biasing said valve to said closed condition when said valve is open;
   means having a normally operative state and an inoperative state for locking said valve in said open condition and for locking said valve in said closed condition; and
   means controllable for rendering said means for locking said valve inoperative whereby said valve changes condition, said means controllable for rendering said means for locking said valve inoperative comprising means responsive to an externally sensed temperature for rendering means for locking said valve inoperative when said sensed temperature is greater than a predetermined value and said valve is closed whereby said valve opens, and means controllable for rendering said means for locking said valve inoperative when said valve is open and said sensed temperature is less than said predetermined value whereby said valve closes.

10. A device for controlling the flow of a liquefied gas comprising:
    means defining a flowpath;
    a valve actuatable to an open condition and a closed condition for opening and closing said means defining a flowpath;
    means comprising a gas-filled closed circuit comprising an expandable and contractible hollow elastic member connected in said flowpath directly to said valve and responsive to the temperature of said flow liquefied gas for biasing said valve to said open condition when said valve is closed and biasing said valve to said closed condition when said valve is open;
    means having a normally operative state and an inoperative state for locking said valve in said open condition and for locking said valve in said closed condition; and
    means controllable for rendering said means for locking said valve inoperative whereby said valve changes condition, means defining a hollow sealed cavity disposed around at least a portion of said means defining a flowpath for thermally insulating at least a portion of said means defining a flowpath, and further comprising, means separating said means defining a hollow sealed cavity into an inner portion and an outer portion, said inner portion and said outer portion not being in communication, means defining a gas chamber disposed for exchanging heat with said means defining a flowpath, a gas absorbing body disposed in said means defining said gas chamber, and means for providing communication between said inner portion and said means defining a gas chamber.

11. A device for controlling the flow of a liquefied gas comprising:
    means defining a flowpath;
    a valve actuatable to an open condition and a closed condition for opening and closing said means defining a flowpath;
    means comprising a gas-filled closed circuit comprising an expandable and contractible hollow elastic member connected in said flowpath directly to said valve and responsive to the temperature of said flow liquefied gas for biasing said valve to said open condition when said valve is closed and biasing said valve to said closed condition when said valve is open;
    means having a normally operative state and an inoperative state for locking said valve in said open condition and for locking said valve in said closed condition; and
    means controllable for rendering said means for locking said valve inoperative whereby said valve changes condition, said valve being disposed slidable in an axial direction of said means defining a flowpath, said valve having an axial cylindrical hollow extension provided with recesses longitudinally disposed on an inner surface thereof, said means for locking said valve comprising a sleeve extending into said cylindrical extension, said sleeve having at least one recess disposed on an outer surface thereof opposite said recesses in said cylindrical extension, and at least one ball disposed to engage the recess in said sleeve and one of said recesses in said cylindrical extension thereby preventing relative displacement between said sleeve and said valve.

* * * * *